(12) United States Patent
Cerqueira et al.

(10) Patent No.: US 11,321,667 B2
(45) Date of Patent: May 3, 2022

(54) SYSTEM AND METHOD TO EXTRACT AND ENRICH SLIDE PRESENTATIONS FROM MULTIMODAL CONTENT THROUGH COGNITIVE COMPUTING

(71) Applicant: International Business Machines Corporation, Armonk, NY (US)

(72) Inventors: Renato Fontoura de Gusmão Cerqueira, Barra Da Tijuca (BR); Marcio Ferreira Moreno, Rio de Janeiro (BR); Rafael Rossi de Mello Brandao, Rio de Janeiro (BR); Rodrigo Costa Mesquita Santos, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 15/711,730

(22) Filed: Sep. 21, 2017

(65) Prior Publication Data

US 2019/0087780 A1     Mar. 21, 2019

(51) Int. Cl.
| | |
|---|---|
| *G06Q 10/10* | (2012.01) |
| *G06K 9/00* | (2022.01) |
| *G10L 15/18* | (2013.01) |
| *G06F 3/00* | (2006.01) |
| *G06F 16/438* | (2019.01) |
| *G06F 40/169* | (2020.01) |
| *G06V 30/40* | (2022.01) |
| *G06V 30/413* | (2022.01) |
| *G10L 15/26* | (2006.01) |

(52) U.S. Cl.
CPC .......... *G06Q 10/101* (2013.01); *G06F 3/002* (2013.01); *G06F 16/4393* (2019.01); *G06F 40/169* (2020.01); *G06V 30/40* (2022.01); *G06V 30/413* (2022.01); *G10L 15/1815* (2013.01); *G10L 15/26* (2013.01)

(58) Field of Classification Search
CPC ... G06Q 10/101; G06F 16/4393; G06F 3/002; G06F 17/241; G06F 40/169; G06K 9/00456; G10L 15/1815; G10L 15/26; G06V 30/40; G06V 30/413
USPC ....................................................... 715/732
See application file for complete search history.

(56) References Cited

U.S. PATENT DOCUMENTS

| | | | |
|---|---|---|---|
| 6,342,904 B1 | 1/2002 | Vasudevan et al. | |
| 6,560,281 B1 | 5/2003 | Black et al. | |
| 6,646,655 B1 * | 11/2003 | Brandt | H04N 5/06 |
| | | | 348/E5.011 |

(Continued)

*Primary Examiner* — Tadesse Hailu
*Assistant Examiner* — Darrin Hope
(74) *Attorney, Agent, or Firm* — Joseph Petrokaitis, Esq.; McGinn I.P. Law Group, PLLC.

(57) ABSTRACT

A system, product, and method including automatically performing extraction of slides from multimodal content, performing object extraction from each of the slides, allowing object substitution through semantics and concepts of the objects extracted, processing audio synchronized with the slides enriched with cognitive computing, search engine, and knowledge base, to provide annotations of the slides, processing the audio synchronized with the object being presented in each slide to enhance semantics and understanding, and curating for each step with human-machine interaction to provide a learning process by the system.

20 Claims, 22 Drawing Sheets

(56) References Cited

U.S. PATENT DOCUMENTS

| | | | |
|---|---|---|---|
| 7,890,327 B2 | 2/2011 | Dorai et al. | |
| 2009/0113278 A1* | 4/2009 | Denoue | G06F 3/017 |
| | | | 715/201 |
| 2009/0162828 A1* | 6/2009 | Strachan | G09B 7/00 |
| | | | 434/350 |
| 2015/0379094 A1* | 12/2015 | Ehlen | G06F 3/038 |
| | | | 707/722 |
| 2018/0130496 A1* | 5/2018 | Mahapatra | G11B 27/031 |
| 2018/0359530 A1* | 12/2018 | Marlow | G11B 27/02 |
| 2019/0155883 A1* | 5/2019 | Wang | G06K 9/00456 |

* cited by examiner

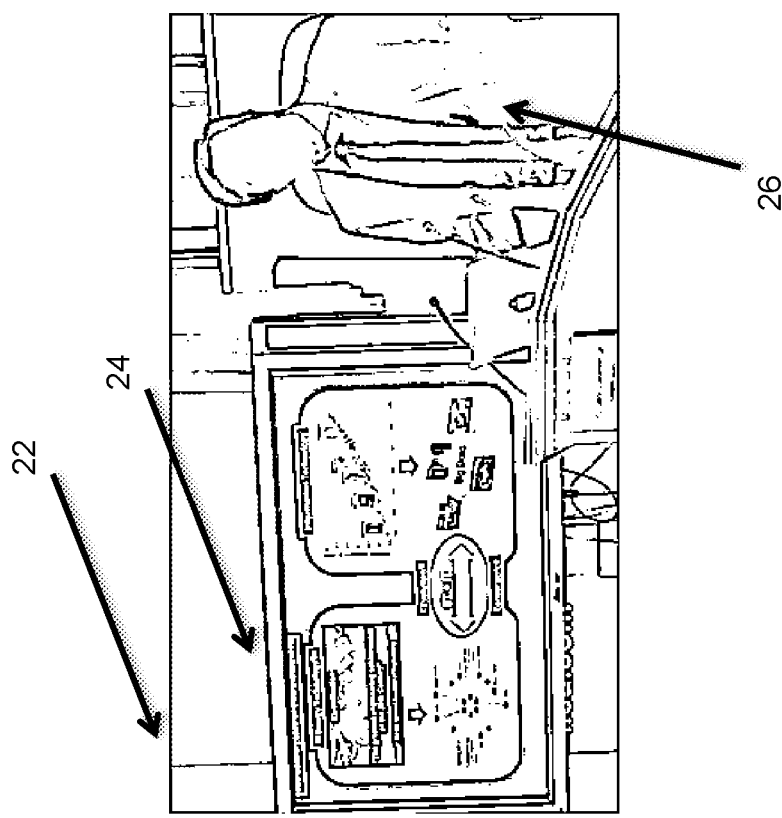
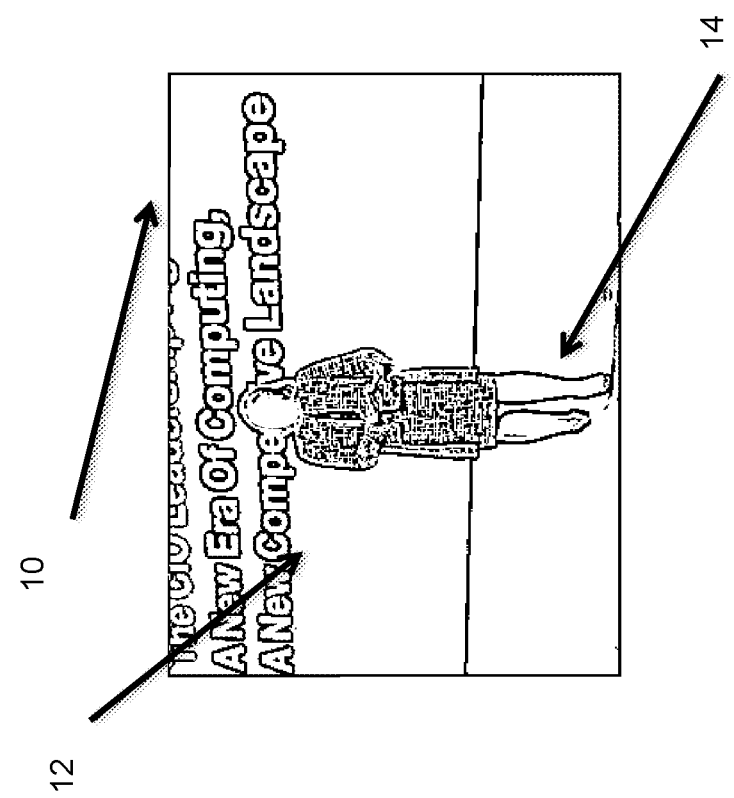
FIG. 1

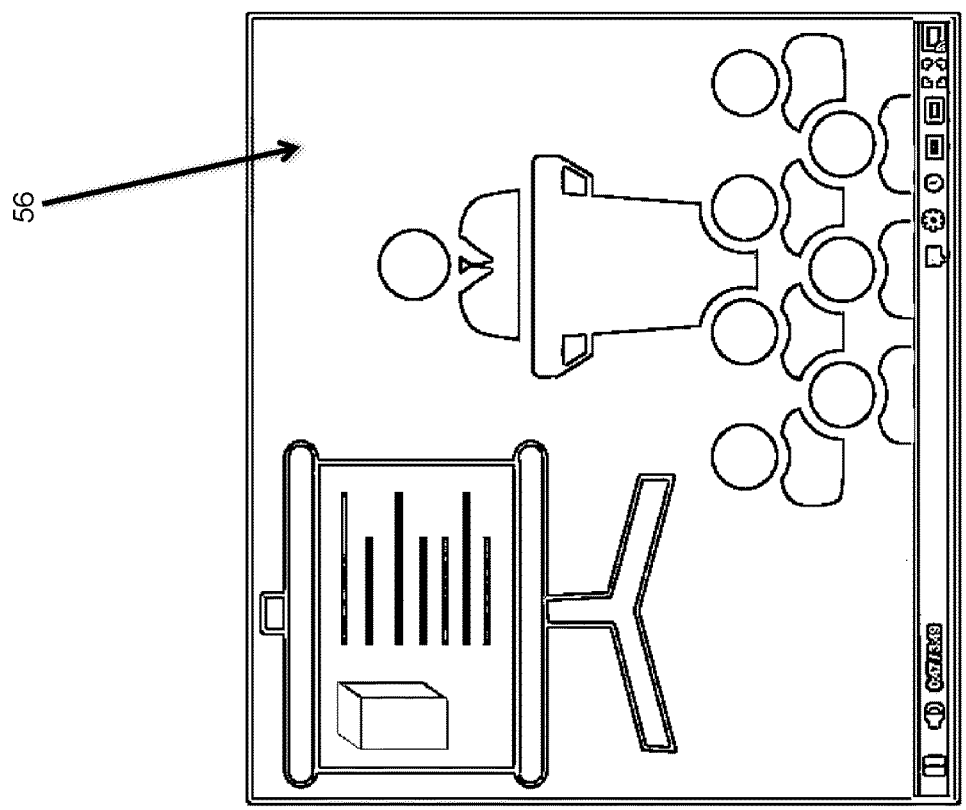
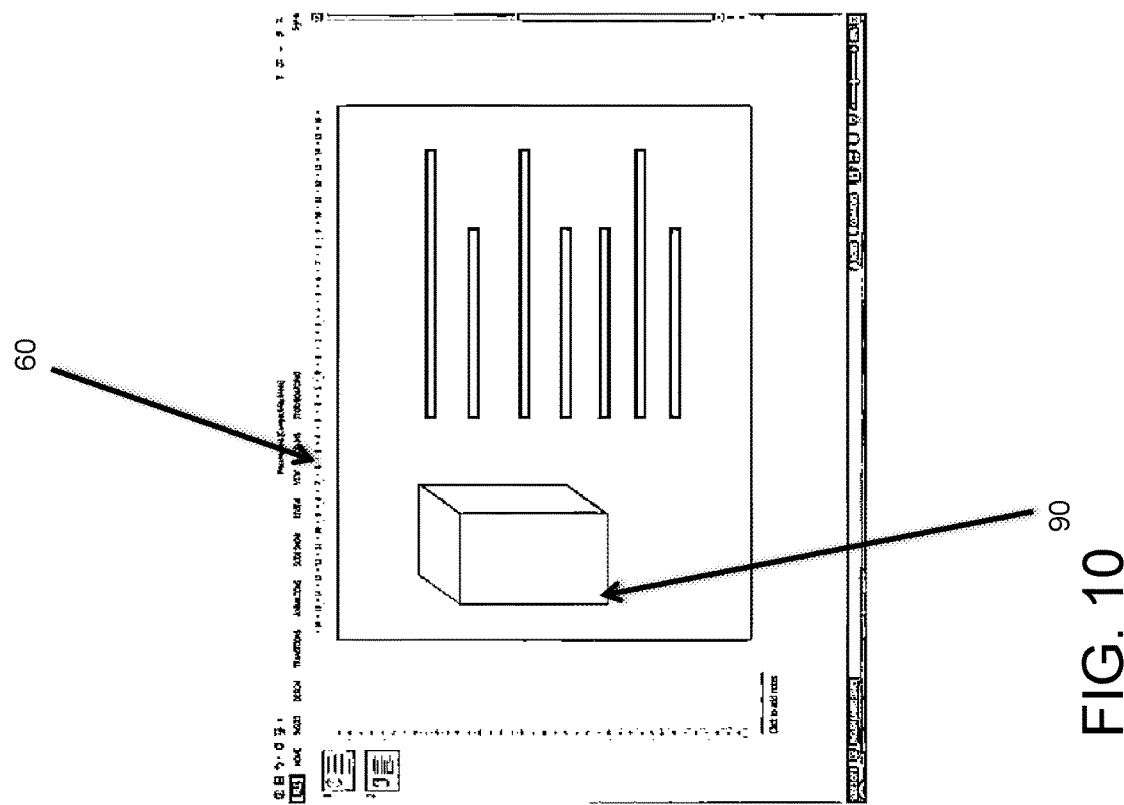
FIG. 10

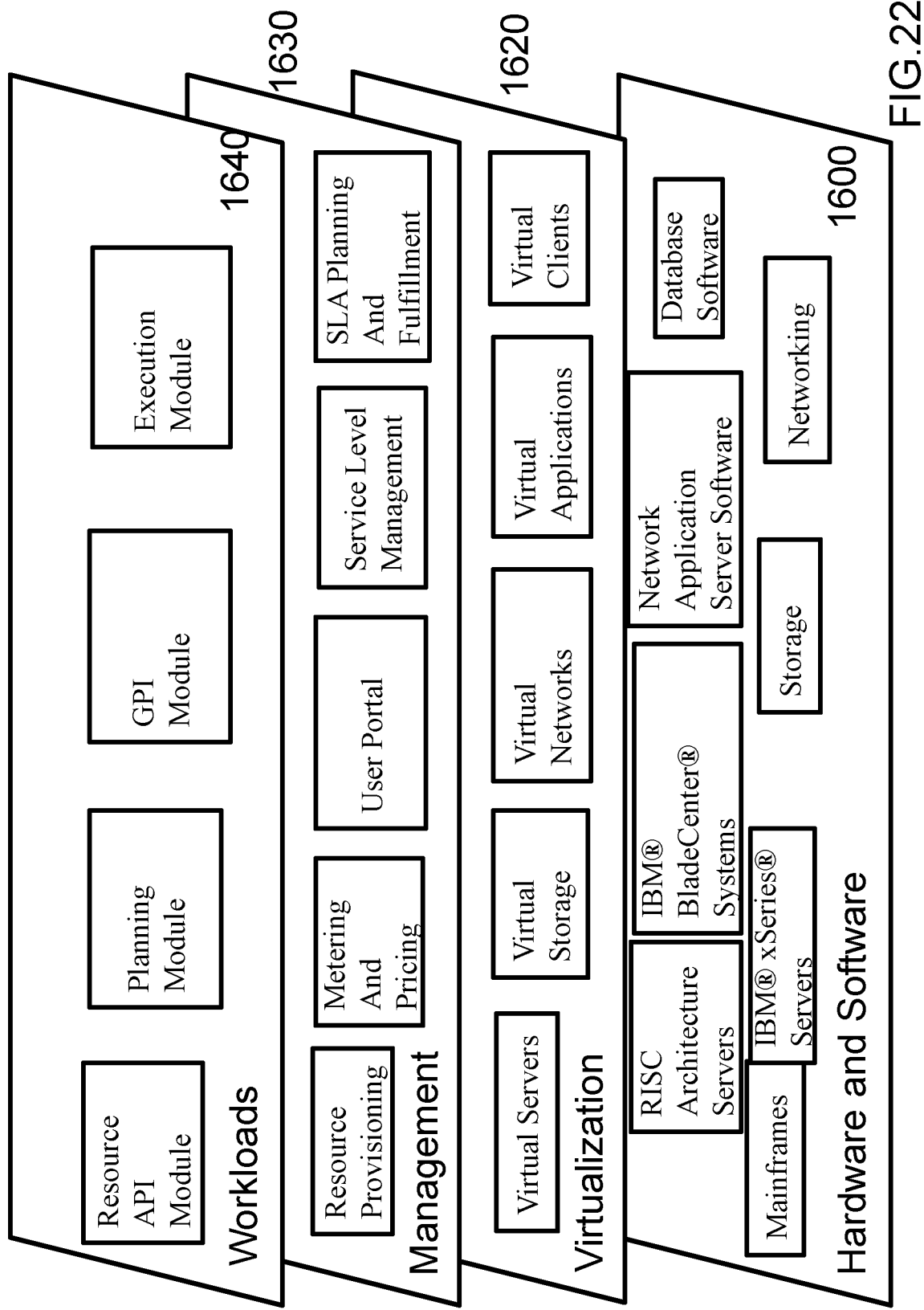

SYSTEM AND METHOD TO EXTRACT AND ENRICH SLIDE PRESENTATIONS FROM MULTIMODAL CONTENT THROUGH COGNITIVE COMPUTING

BACKGROUND OF THE INVENTION

Field of the Invention

The present invention relates generally to a method, system and apparatus for extracting and enriching multimedia content, and more particularly relates to a method, system, and apparatus for extract and enrich slide presentations from multimodal content through cognitive computing.

Description of the Related Art

There is much multimodal content (multimedia applications, audiovisual content, motion pictures, audio, video, etc.) available today covering valuable slide presentations. The purpose of these presentations may vary from educational, business, motivational, entertainment, etc. No matter the purpose, if the presentation is, in fact, valuable, there will be always a demand for extracting it from the multimodal content. Indeed, with the extracted slide presentation, one can, for example, enhance the presentation with personal annotations to a better subject learning/understanding, edit the presentation to make one's own future talks, forward it to students or work colleagues, etc.

On the one hand, differently from the audiovisual content, manipulation of slide presentations is far easier, allowing editing text, images, annotations, animations, and other objects. On the other hand, currently, there is a lack of mechanisms capable of extracting slide presentations from audiovisual content. For example, previous solutions do not foresee mechanisms to process audiovisual content to extract the slide presentation per se. Instead, the current methods try to summarize the audiovisual content or extract some semantic information from it.

SUMMARY OF INVENTION

In view of the foregoing and other problems, disadvantages, and drawbacks of the aforementioned background art, an exemplary aspect of the present invention provides a method, system, and apparatus to extract and enrich slide presentations from multimodal content through cognitive computing.

One aspect of the present invention provides a method including automatically performing extraction of slides from multimodal content, automatically performing object extraction from each of the slides, allowing object substitution through semantics and concepts of the objects extracted, processing audio synchronized with the slides enriched with cognitive computing, search engine, and knowledge base, to provide annotations of the slides, processing the audio synchronized with the object being presented in each slide to enhance semantics and understanding, and curating for each step with human-machine interaction to provide a learning process by the system.

Another aspect of the present invention provides a computer program product comprising a computer readable storage medium having program instructions embodied therewith, the program instructions and hardware descriptions readable and executable by a computer to cause the computer to automatically performing extraction of slides from multimodal content, automatically performing object extraction from each of the slides, allowing object substitution through semantics and concepts of the objects extracted, processing audio synchronized with the slides enriched with cognitive computing, search engine, and knowledge base, to provide annotations of the slides, processing the audio synchronized with the object being presented in each slide to enhance semantics and understanding, and curating for each step with human-machine interaction to provide a learning process by the system.

Yet another aspect of the present invention provides a system, including a network, a virtual computer connected to the network, including a virtual memory storing computer instructions, a virtual processor executing the computer instructions and configured to perform extraction of slides from multimodal content, perform object extraction from each of the slides, allow object substitution through semantics and concepts of the objects extracted, process audio synchronized with the slides enriched with cognitive computing, search engine, and knowledge base, to provide annotations of the slides, process the audio synchronized with the object being presented in each slide to enhance semantics and understanding, and curate for each step with human-machine interaction to provide a learning process by the system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF DRAWINGS

The exemplary aspects of the invention will be better understood from the following detailed description of the exemplary embodiments of the invention with reference to the drawings.

FIG. 1 illustrates two different example presentations.

FIG. 10 illustrates the step of creating new slides the exemplary embodiment.

FIG. 22 depicts abstraction model layers according to an embodiment of the present invention.

DETAILED DESCRIPTION OF A PREFERRED EMBODIMENTS

Figure 2:
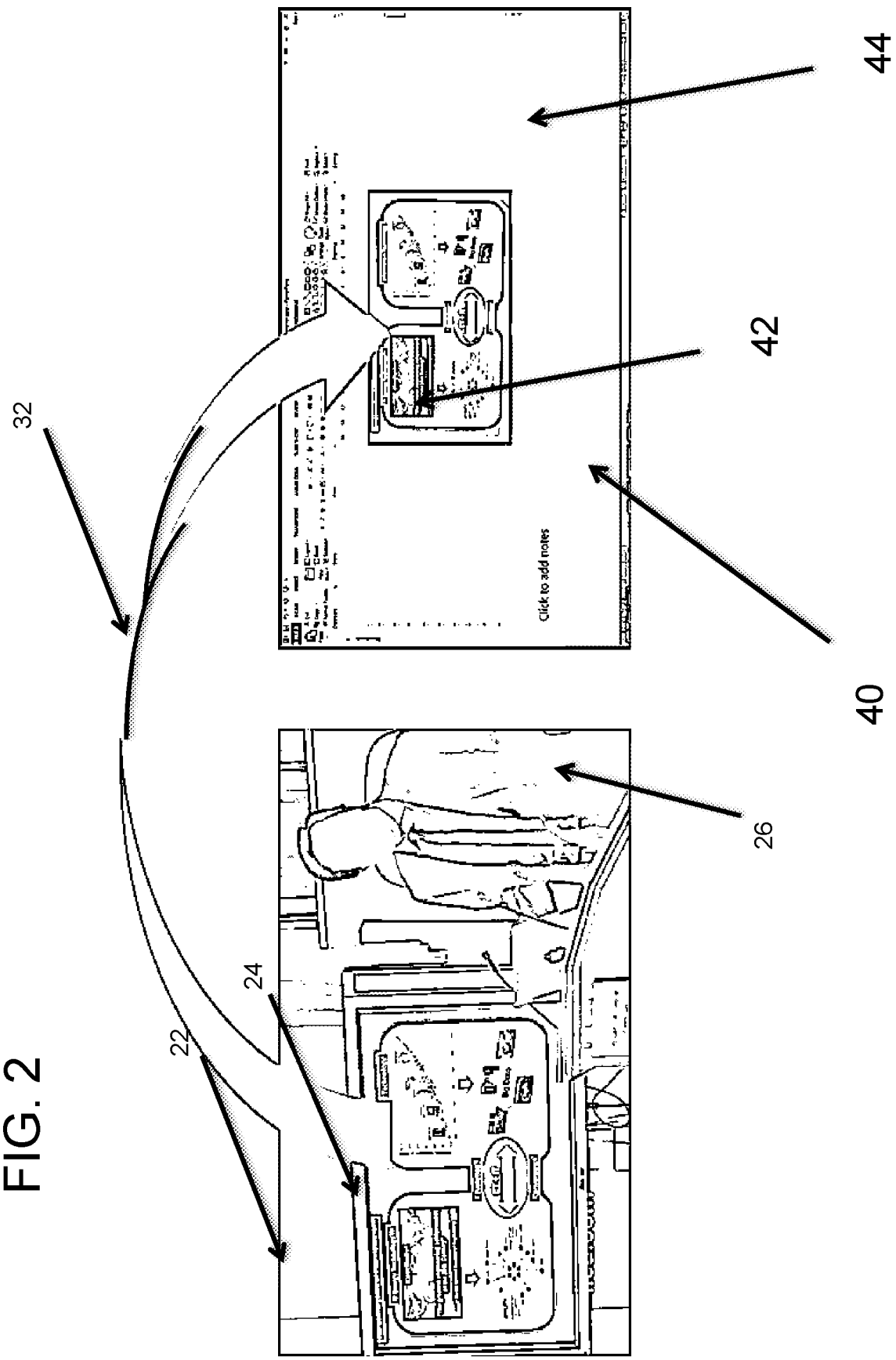
FIG. 2 illustrates automatic slide detection and content extraction of an exemplary embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

The present invention provides extracting and enriching slide presentations from audiovisual content, by using cognitive computing, multimodal content processing, and knowledge engineering. Some current solutions only extract text after OCR (Optical Character Recognition) content processing, to create presentation outlines.

Other solutions aim to create a slide presentation by extracting key frames from the content, instead of extracting the embedded slide presentation per se. This disclosure processes the multimodal content to extract slides and its objects, aiming at creating rich presentations.

The present invention foresees a system, apparatus, and method to extract and enrich slide presentations from audiovisual content. The process begins when a user sets the content as input. The system then segments each existent modality (audio, video, text in form of subtitles or closed caption, etc.).

A content processor is in charge of processing each content modality, communicating with a cognitive computing system. This system extracts each slide from the content by using templates available in the knowledge base (e.g. templates can determine that the system shall monitor static background, luminosity, and presentation format like 4:3 and 16:9 rectangles considering possible surface rotations and transformations). This system extracts the semantics and concepts of each frame to contextualize the current slide being presented. Moreover, it uses audio processing (text-to-speech, natural language understanding, etc.) not only to aid in the contextualizing step, but also to create annotations in the respective slide.

An object monitor is responsible for monitoring each extracted object from each slide, aiming at reproducing existent object animations. Similar monitors perform the same to check and reproduce slide transitions. During the creation of the rich slide presentation, a user can interact with the cognitive computing system to perform user curation and object replacement, which is done by cognitive computing suggestions according to extracted semantics and concepts, and according to its knowledge base. Finally, the system learns from the process and registers all relevant information in its knowledge base.

The system and method to extract and enrich slide presentations from multimodal content through cognitive computing include slide extraction, slide transition extraction, object extraction, object animation extraction, and allowing object substitution.

FIG. 1 illustrates two different example presentations. Currently, there is a plurality of valuable slide presentations embedded in multimodal content (such as multimedia applications, motion pictures, audio tracks, webcast videos, etc.). The presentations are widely used in different contexts, such as business, education, motivational, entertainment, etc. Differently from audiovisual content, manipulating slide presentations is far easier, since they allow directly retrieving relevant information, editing text, images, annotations, animations, and other objects. However, there is a lack of solutions to support extracting slide presentations that are embodied in multimodal content (e.g. audio, video, text, graphics combined), in case the original slide presentation is not available. For example, as seen in FIG. 1, on a display there can be a video 10 may include a presentation 12 and another video 22 may include a presentation 24. The presenters 14 and 26 are providing the slide presentations that can be seen in the videos 10 and 22, respectively.

FIG. 2 illustrates automatic slide detection and content extraction of an exemplary embodiment. This present invention aims at extracting information from presentations that may be embodied in different media content, in order to create and structure rich slide presentations. The idea is to precisely perceive and understand objects in slides, their semantics and relationships, to extract information and organize it in slide presentations. Besides detecting and extracting text from actual slide presentations, the disclosed system processes and correlates multiple modalities, including speech, handwriting, hand gestures and externalized expressions. In the following, there are examples of how multimodal content could be explored. The presentation 24 in the video file is extracted 32 to a computer 40 as a presentation 42 in a different format as seen in the example program 44.

Figure 3:
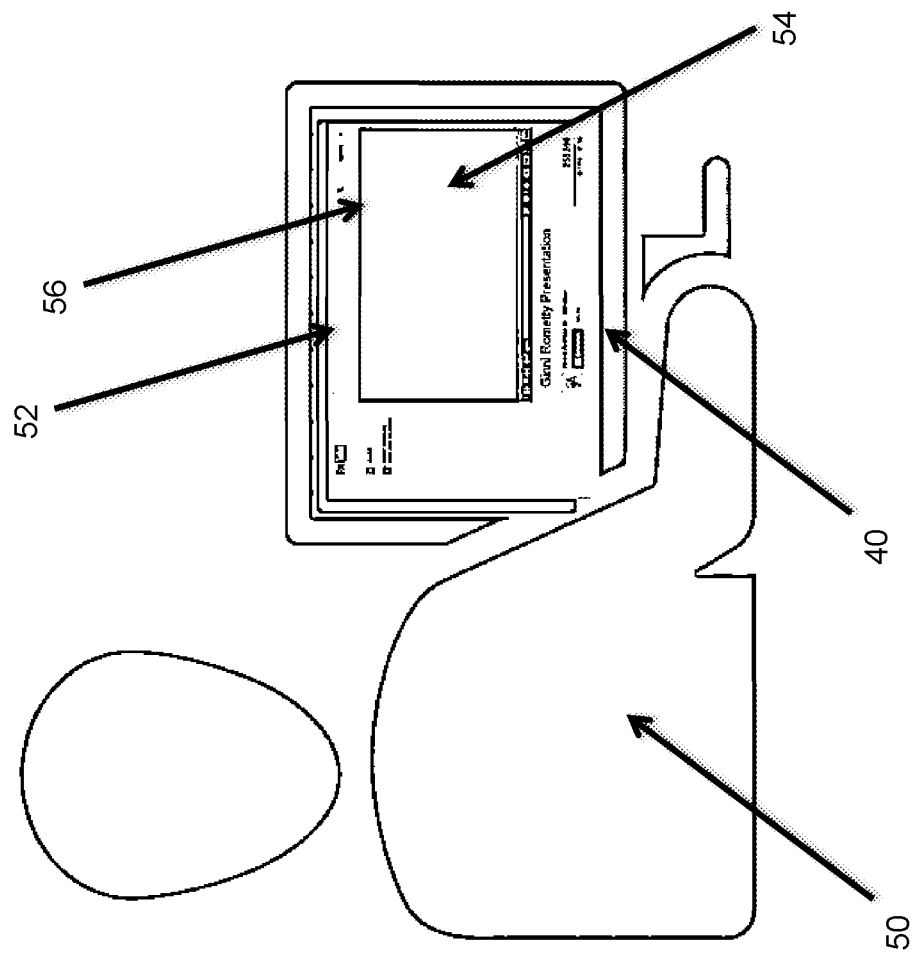
FIG. 3 illustrates a beginning step of user viewing a video file of the exemplary embodiment.

FIG. 3 illustrates a beginning step of a user viewing a video file of the exemplary embodiment. In the first step when a user 50 wants to watch an existent video 56 on a web browser 52 on a computer 40, which can be a video file, a live (e.g. private corporate streaming) or on demand (e.g. ted talks from YOUTUBE) stream, etc. In the present example, the user 50 has selected the "GR Presentation" from YOUTUBE. In this scenario, the present invention is instantiated as a web browser add-on 54 for the browser 52.

Figure 4:
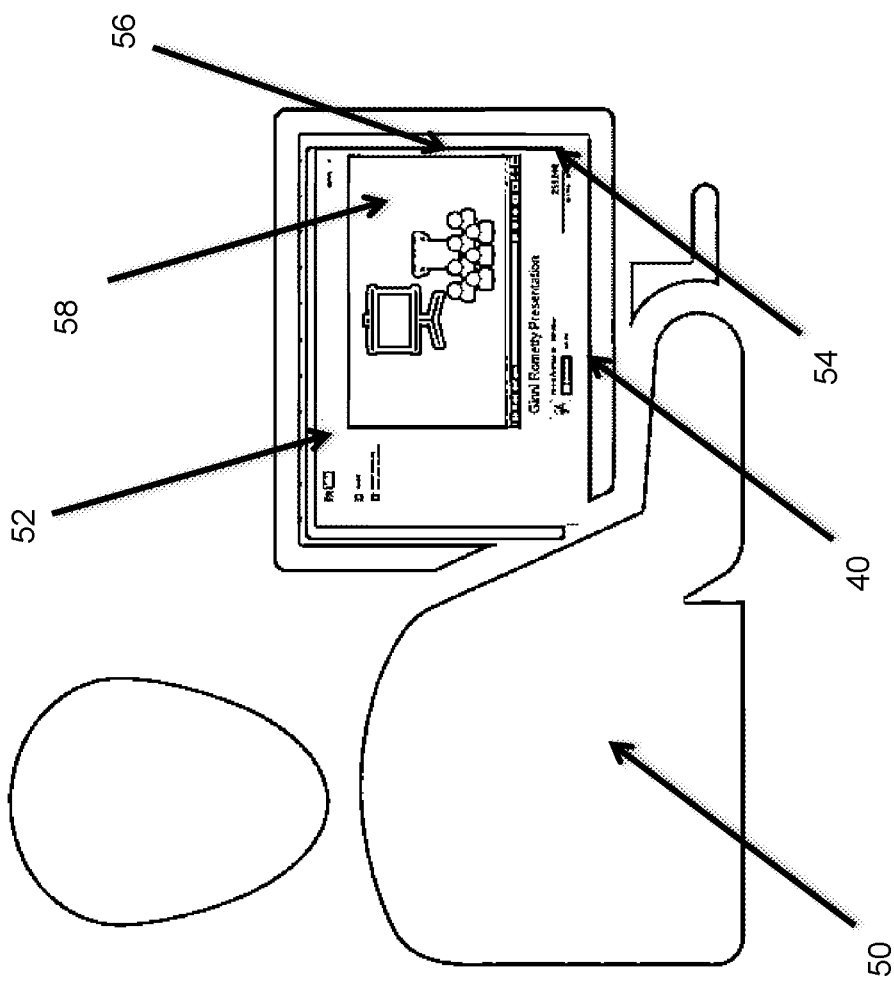
FIG. 4 illustrates the user viewing and add-on processing starting.

FIG. 4 illustrates the user viewing and add-on processing starting. In the second step, the user 50 starts the video presentation (i.e. play) 56. Meanwhile, the add-on 54 starts processing the content 58 of the video 56. Note that the video from YOUTUBE consists in a multimodal content. That is, it has multiple forms of content representation (i.e.: text: closed caption; audio: speeches; video: visual content).

Figure 5:
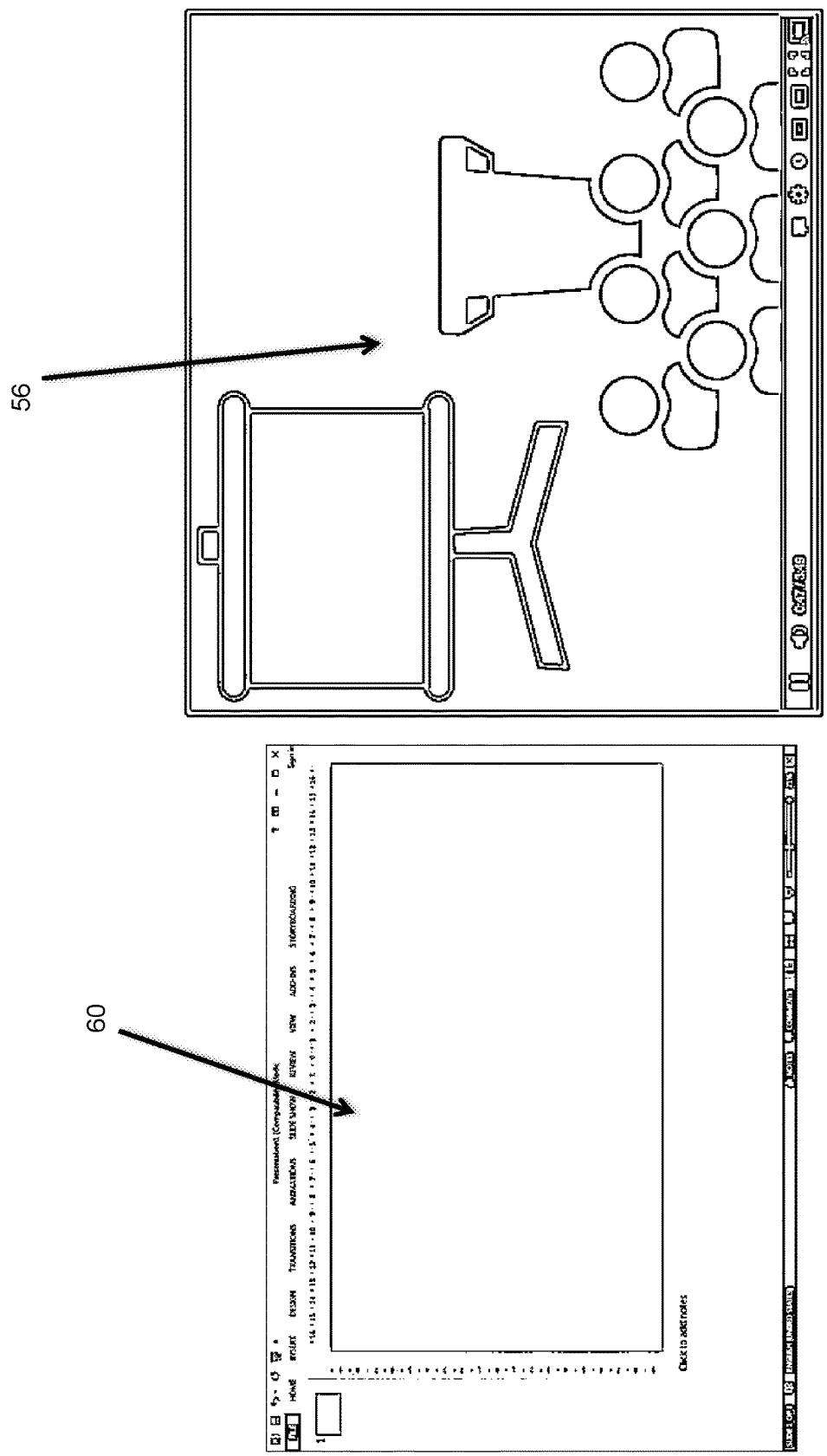
FIG. 5 illustrates a processing step of the exemplary embodiment.

FIG. 5 illustrates a processing step of the exemplary embodiment. In the third step, although the presentation 58 (See FIG. 4) was not initiated in the video 56 yet, an initial slide presentation is automatically created, according to user 50 (See FIG. 4) preferences. The process of extracting and structuring information from the video 56 to the slide presentation 60 can be done on the fly for live events (in real-time), or in case of previously recorded events, by processing the entire content beforehand. Moreover, the present invention foresees the generation of different presentation formats. In the example, there is illustrated the creation of a slide presentation, other types of presentations can also be made and any type of slide presentation software can be extracted.

Figure 6:
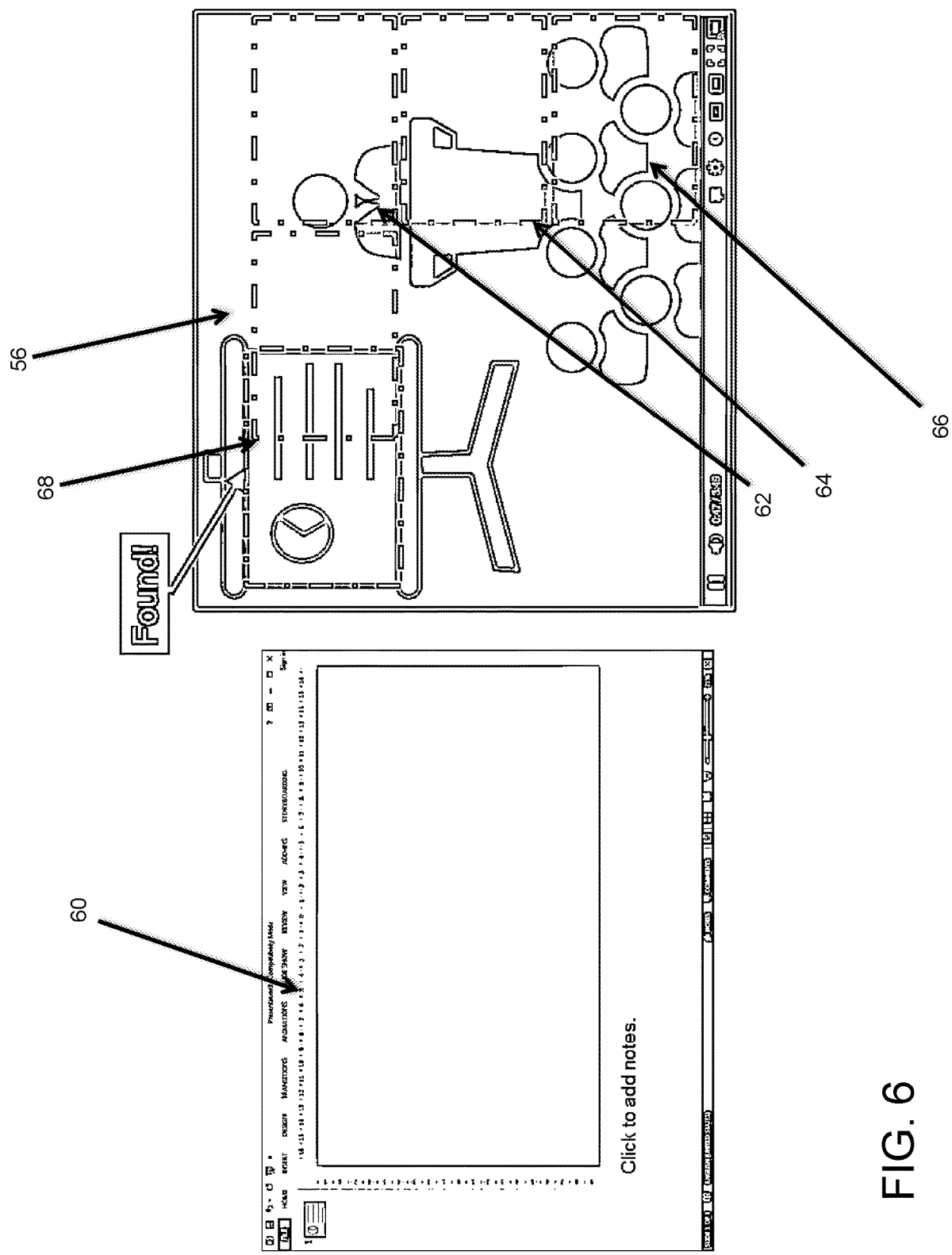
FIG. 6 illustrates a further detail of the processing in the exemplary embodiment.

FIG. 6 illustrates a further detail of the processing in the exemplary embodiment. In the fourth step, the system processes the content, searching for regions (example regions 62-68) in the video 56 that there is an ongoing slide presentation. This is done by scanning the regions of each video frame using computer vision and cognitive computing techniques. The later with user curation (see the last step in FIG. 12) is used to improve the algorithms of the former.

Here in FIG. 6, for example, the processing of region 62 detects the presenter, region 64 detects the podium of the presenter, and region 66 detects the audience. Then finally, the processing of the region 68 detects the ongoing slide presentation 60.

Figure 7:
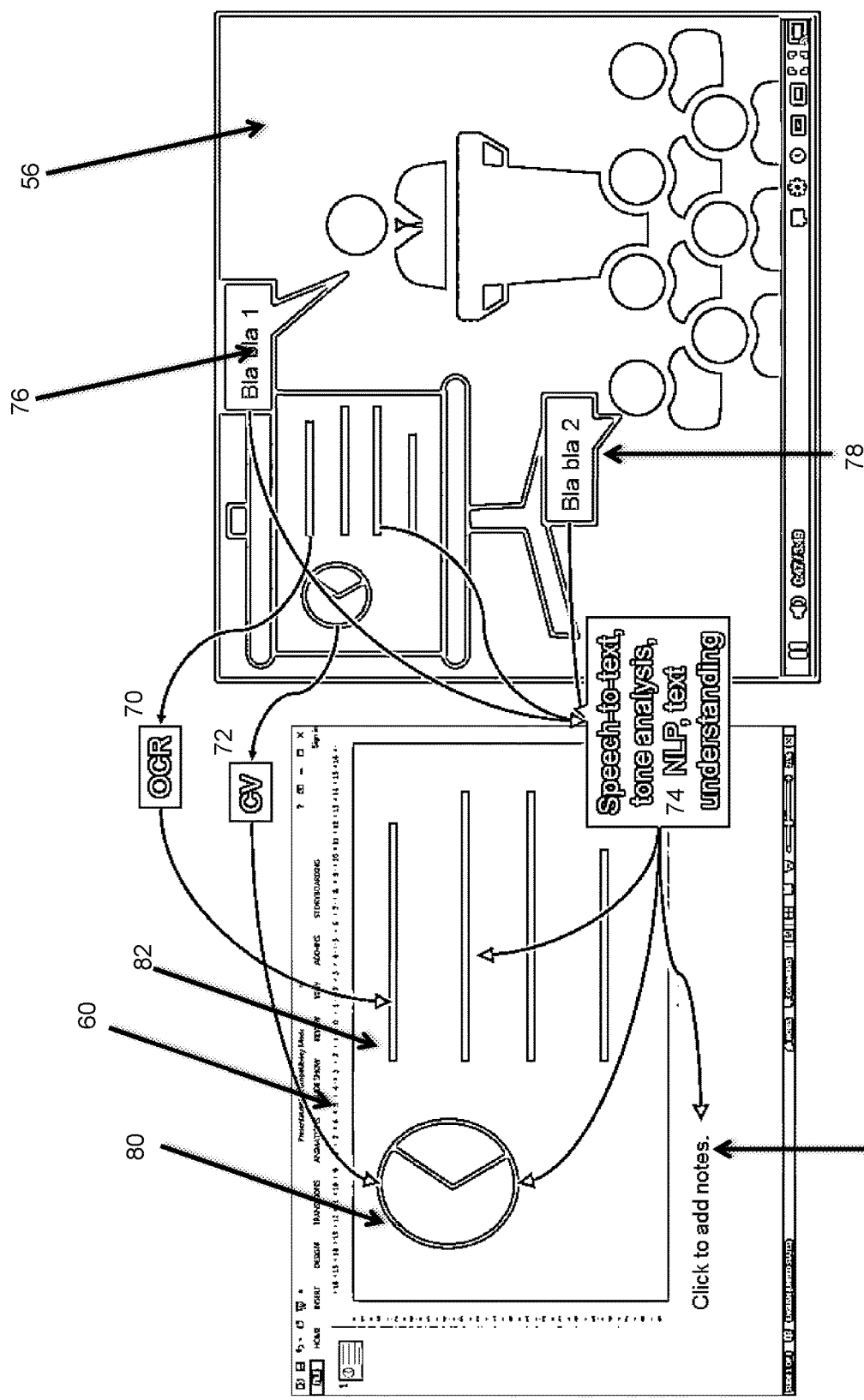
FIG. 7 illustrates a further detail of the processing in the exemplary embodiment.

FIG. 7 illustrates a further detail of the processing in the exemplary embodiment. In the fifth step, after finding the region of interest in the video 56, the system will extract and correlate elements from the current content (such as text, images, graphics, audio, etc.), aiming at creating the corresponding structured information (the first slide in our example, as illustrated in the slide presentation 60).

For example, from the video 56, from region 68 (See also FIG. 6) of the slide presentation, OCR 70 is performed from the video and data is extracted to the slide presentation 60 as seen in the text 82. CV 72 is performed to generate graphic images 80 in the slide presentation 60. Speech to text, tone analysis, NLP and text understanding are performed on regions of the audience speech 78 and the presenter 76 to generate, notes 84, text 82 and graphics 80 in the presentation 60.

Figure 8:
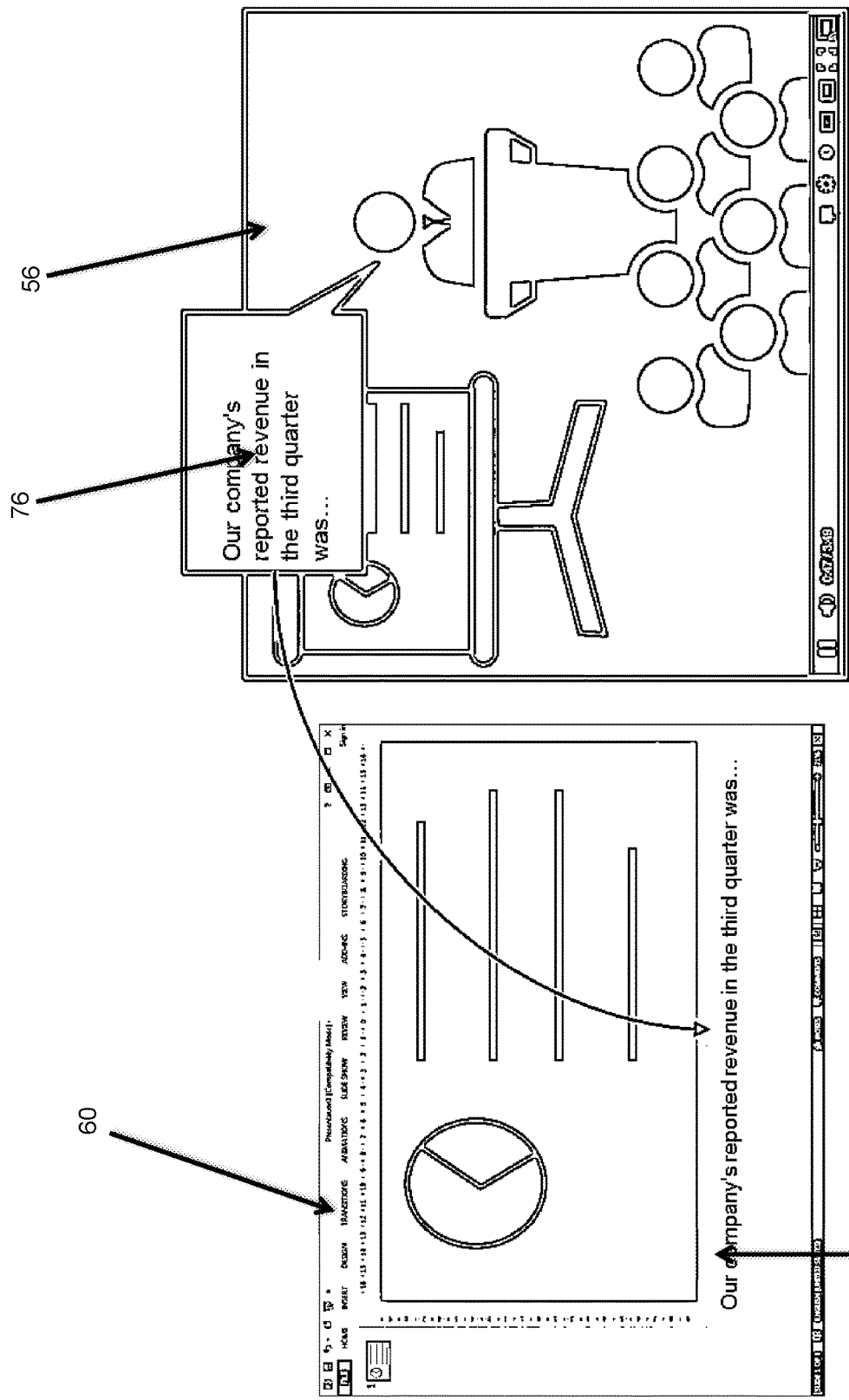
FIG. 8 illustrates additional detail of the processing in the exemplary embodiment.

FIG. 8 illustrates additional detail of the processing in the exemplary embodiment. In the sixth step, besides the extracted elements from the previous step in FIG. 7, the present invention also extracts relevant related content. Presenters' speeches 76 are extracted and registered as slide notes 84. Moreover, relevant and related content detected in these speeches and in the slide elements may be used to retrieve further information by using a search engine.

Figure 9:
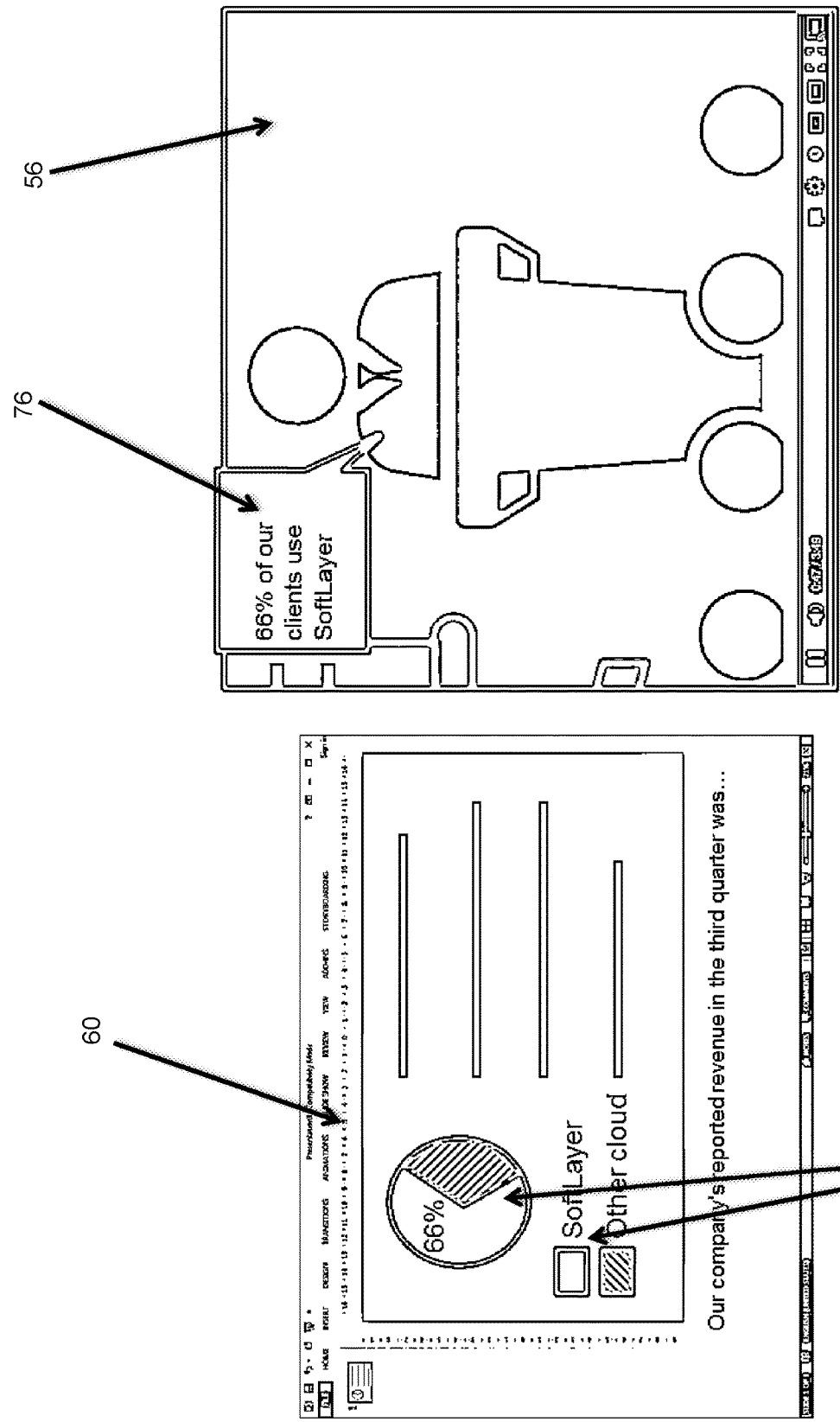
FIG. 9 illustrates the next step of the processing in the exemplary embodiment.

FIG. 9 illustrates the next step of the processing in the exemplary embodiment. In the seventh step, commonly, content that conveys presentations do not display the slide that is being addressed (as illustrated in the video in speech of the presenter 76). However, even in this case, the system is able to create an appropriate slide by extracting current semantics (understanding the presentation subject, the current specific topics, etc.) applying techniques such as NLP, machine learning, text-to-speech, concept extraction, etc. For example, the content of the presenter 76 in video 56 is then placed in the presentation 60 in the graph and legend of the graph 86.

Intelligent mechanisms are able to convert content into knowledge. For instance, NLP on existent text extracts the lexical content and a knowledge structuring mechanism transforms this content into SPO (Subject-Predicate-Object) triples, which is trivially done with existent mechanisms. In this example, these triples are then stored in the knowledge base (see architecture on FIG. 13).

FIG. 10 illustrates the step of creating new slides in the exemplary embodiment. In the eighth step, as the system further processes the content, new slides 90 are created by applying the same approach.

Figure 11:
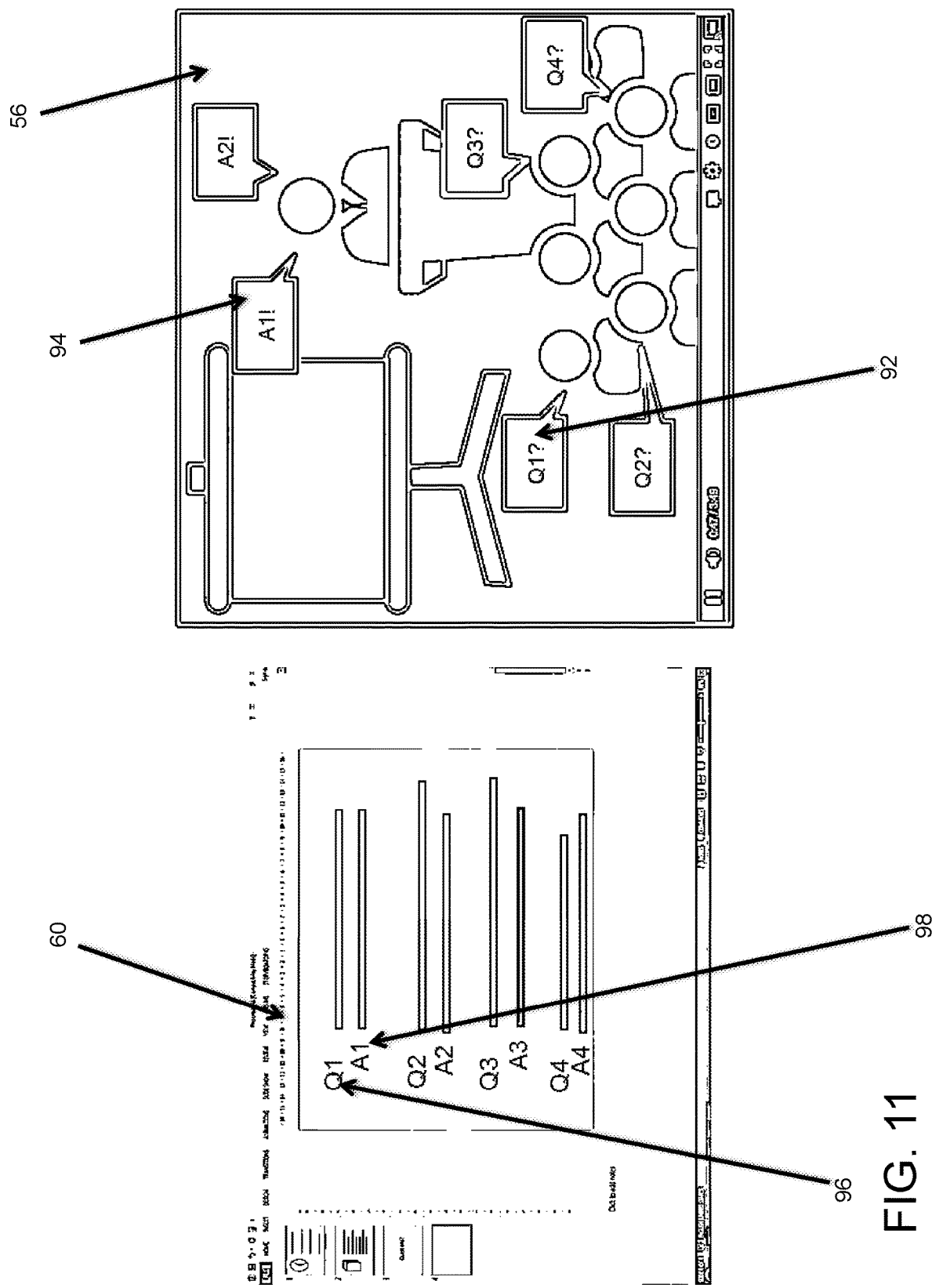
FIG. 11 illustrates the step of extraction in the exemplary embodiment.

FIG. 11 illustrates the step of extraction in the exemplary embodiment. In the ninth step, during the presentation, the system may extract questions 92 from participants' speeches and correspondent answer 94 from the presenter and then enhancing the presentation slides 60 with the question 96 and corresponding answer 98. Also, the system may enrich answers by retrieving extra information using a search engine.

Figure 12:
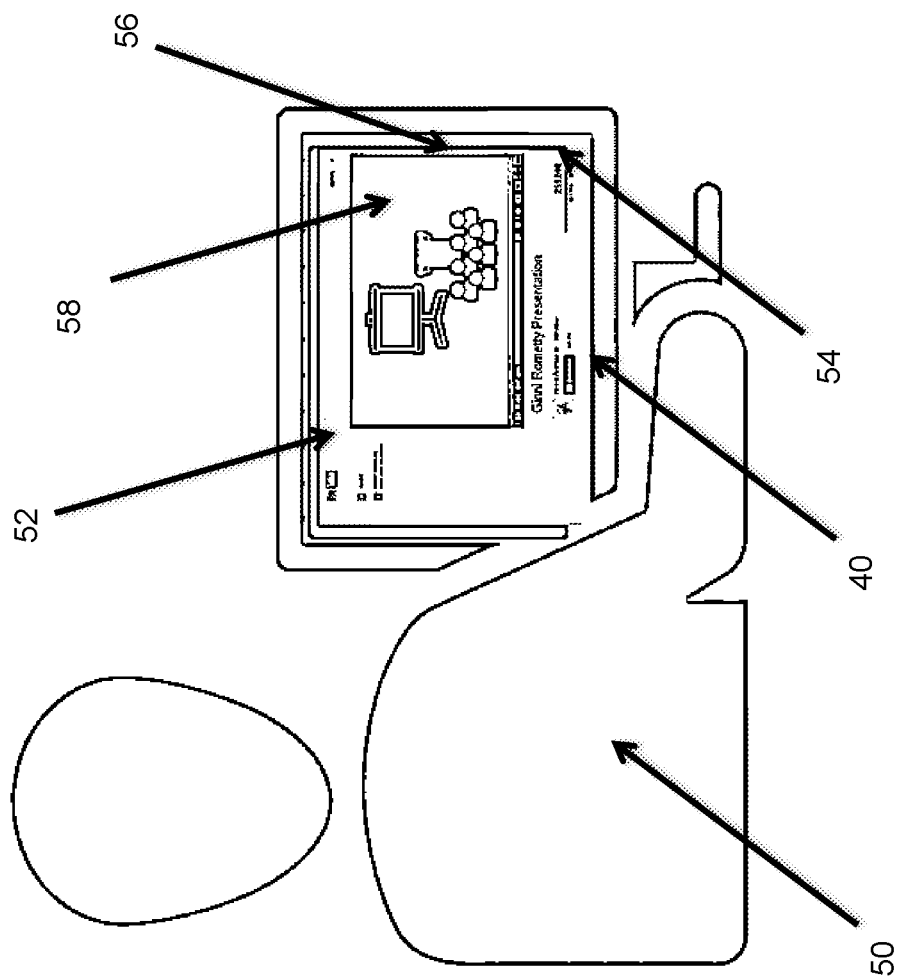
FIG. 12 illustrates the step of user curation in the exemplary embodiment.

FIG. 12 illustrates the step of user curation in the exemplary embodiment. For each extracted information, the user 50 is able to give his feedback about it, correcting information that he deems necessary. The cognitive system in the computer 40 will learn from this interaction, improving its mechanisms for detecting and extracting information.

A summary of all extracted information is presented to the user 50, so he can curate all information. This can be done iteratively, e.g. in a live stream, as elements are extracted in real-time. Or if it is a recorded presentation, the whole content can be analyzed beforehand, so the user always can see this summary with extracted knowledge.

Figure 13:
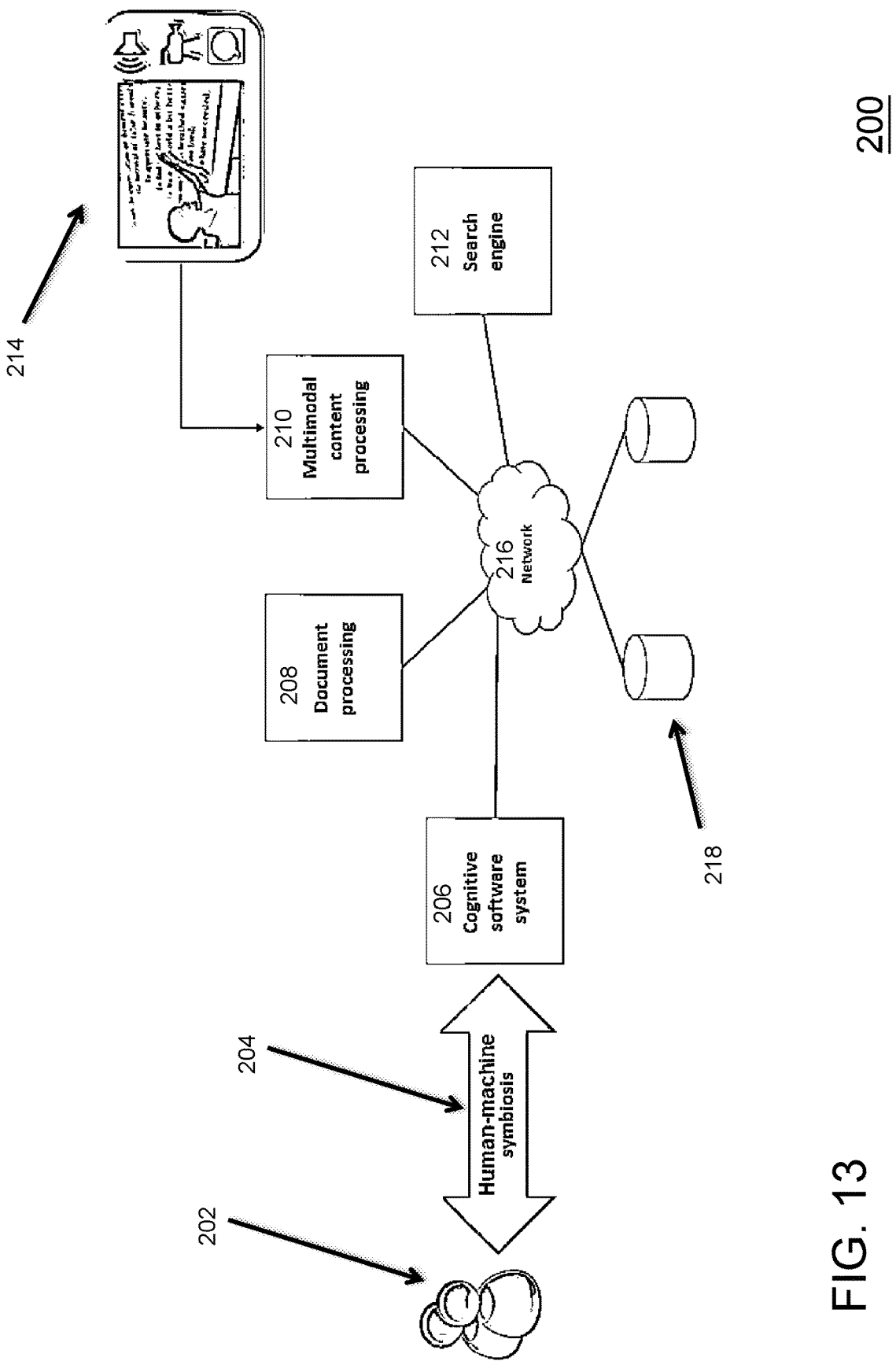
FIG. 13 illustrates an example of a system of an exemplary embodiment.

FIG. 13 illustrates an example of a system of an exemplary embodiment. The multimodal content processing module is responsible for fusion and fission operations, it will handle multimodal content in order to understand and correlate information in each modality.

Therefore, as shown above, the cognitive computing techniques, along with multimodal content processing and knowledge engineering to support the extraction process is shown. These are some of the main modules of the disclosed system. All of them are interconnected so they can use functionalities of each other. Multimodal content processing 210 handles content parsing and multimodal fusion aspects to get specific content segments of the presentation video 214. Cognitive software system 206 holds all cognitive and sensorial processing, capable of identifying concepts by interpreting visual and language aspects represented in content.

Document processing 208 is in charge of creating the output slide document dealing with document engineering aspects, such as conceptual modeling, layout, etc.

After detecting and understanding content semantics, the system 200 may enrich presentations using information retrieved through the Search Engine module 212. This module may consider specific licensing models when fetching content.

Once the slide presentation has been created, the system 200 stores the document in a Slide Repository available in the cloud 216. Similarly, all extracted knowledge is represented in a Knowledge Base in the document repository 218.

All objects in slide presentations may be validated by users 202, promoting a curation of the data over time through a human-machine symbiosis 204. This feedback process may happen iteratively during each object creation, or at a later time by accessing the document repository 218.

Figure 14:
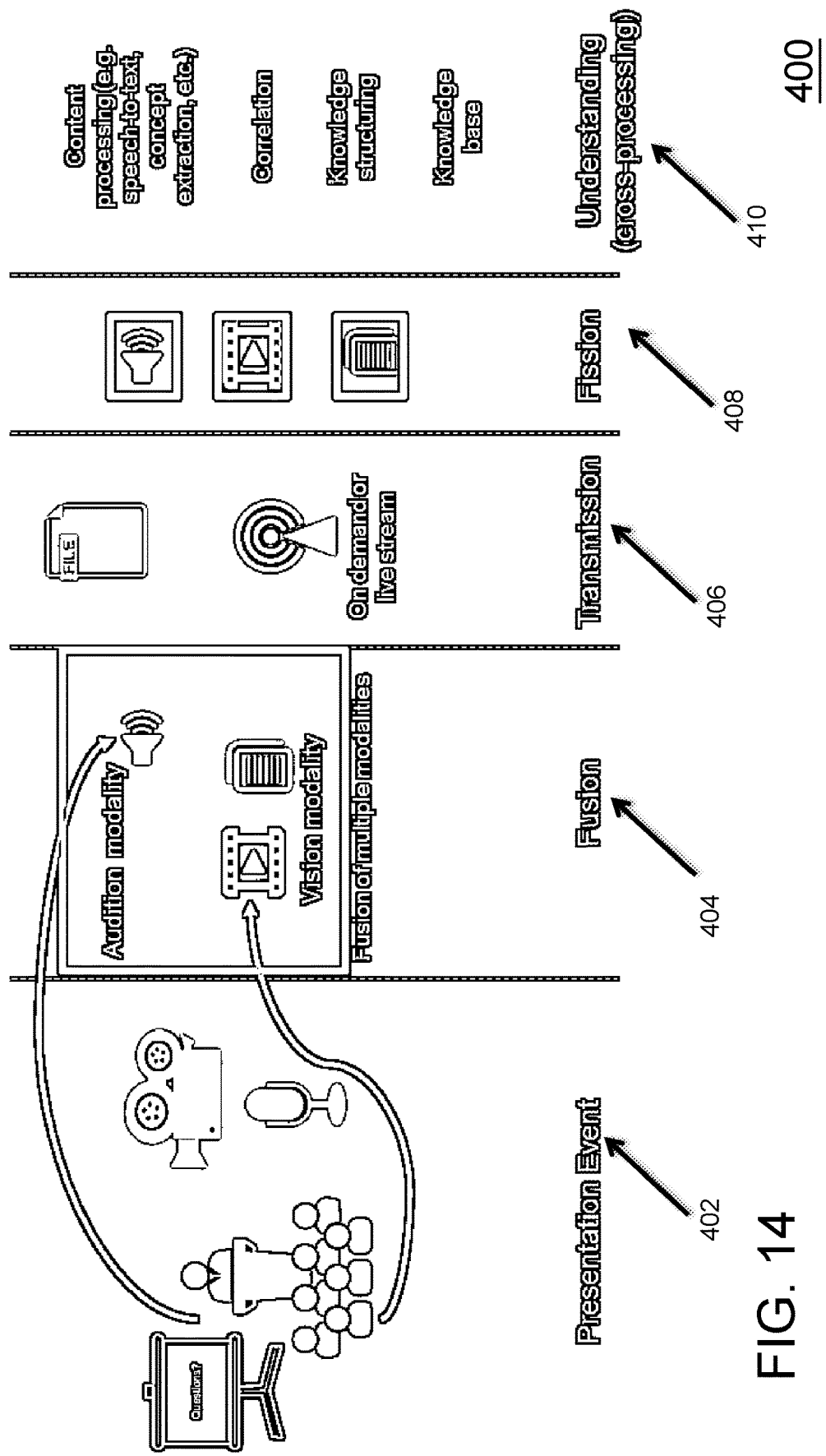
FIG. 14 illustrates a multimodal content processing module of an exemplary embodiment.

FIG. 14 illustrates a multimodal content processing module of an exemplary embodiment 400. The multimodal content processing module 210 (see FIG. 13) is responsible for fusion 404 and fission operations 408, it will handle multimodal content in order to understand and correlate information in each modality from the presentation event 402. After the fusion 404, the content is transmitted 406 and fission operations 408 are made to then perform understanding processing 410.

Figure 15:
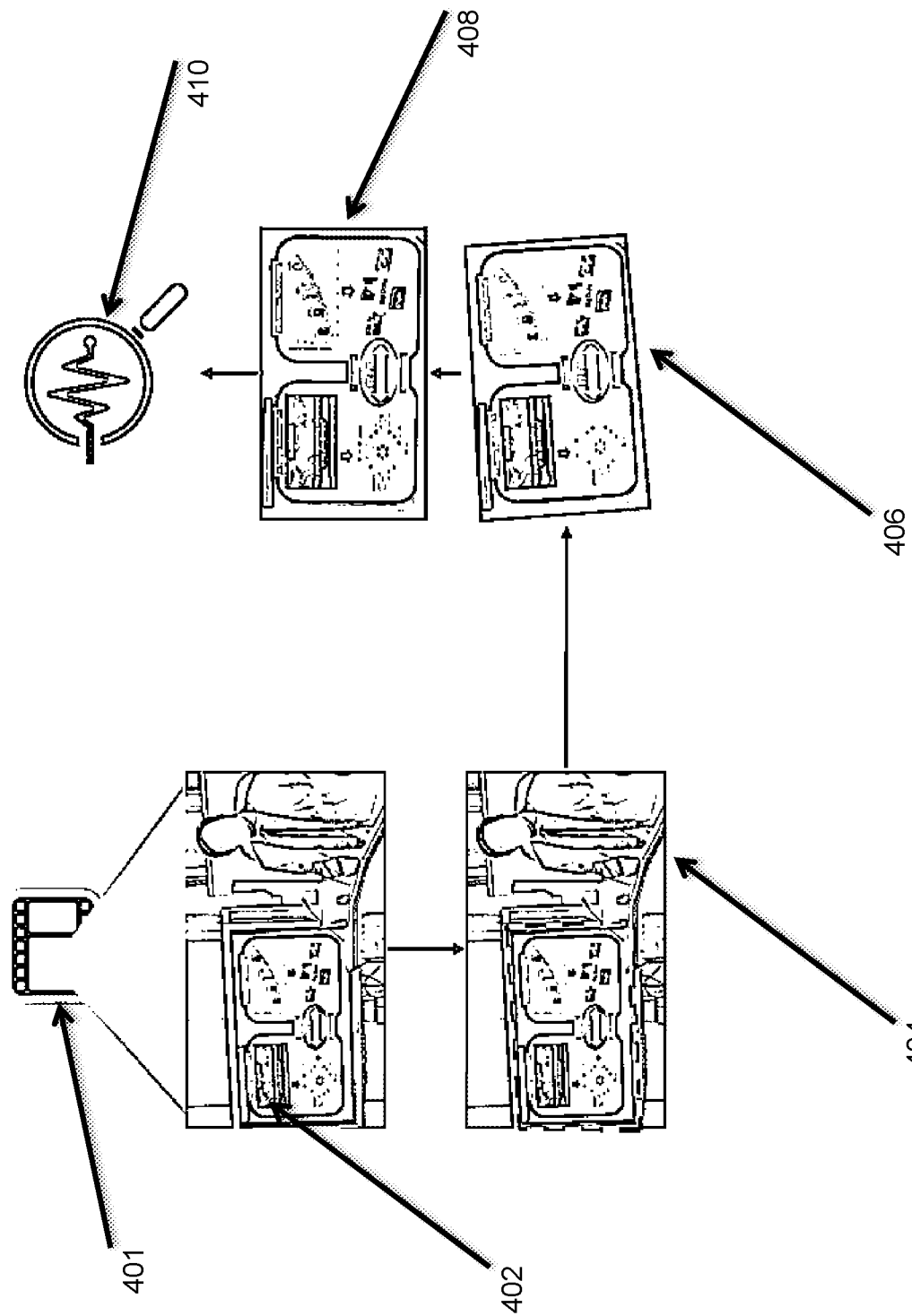
FIG. 15 illustrates another example of the extraction method can be applied.

FIG. 15 illustrates another example of how the extraction method 400 can be applied. The extraction method begins with media content segmentation over the original information 401, regardless of its type. For instance, segments such as audio samples, video frames, text portions, etc., are extracted 402 from the original information 401. For each media segment, the next step is to detect, extract and understand relevant content pertinent to the slide presentation 404 to generate the extracted content 406. Then, a normalization step 408 takes place to adjust the content, for example, applying rotation, distortion or transformation techniques. Finally, all content that has been mapped to slide objects are monitored in order to track their evolution during the presentation 410. Also, their semantics are structured in the knowledge base and will support related content retrieval, aiming at enriching the presentation.

Figure 16:
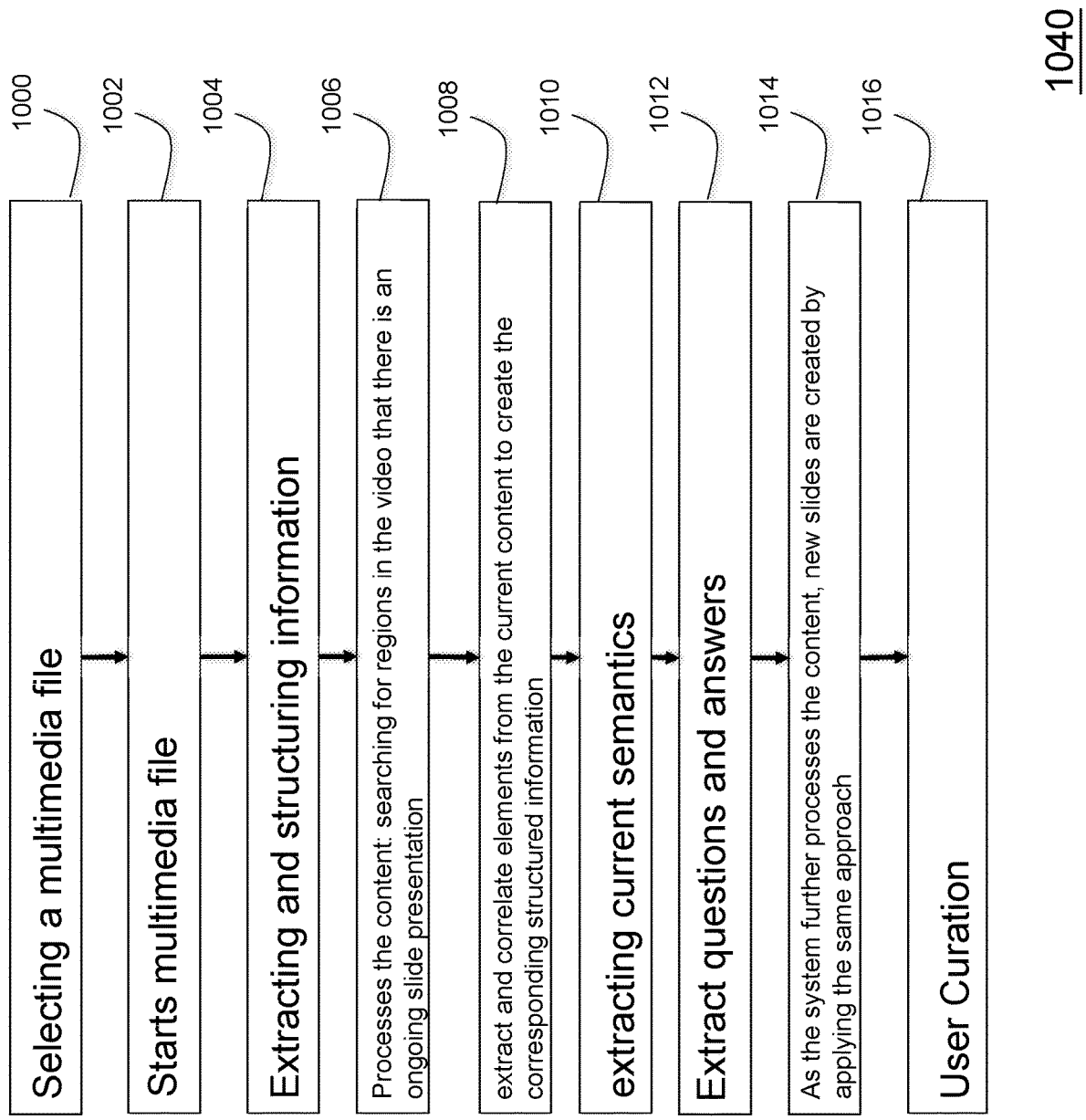
FIG. 16 illustrates a flow diagram of an exemplary embodiment.

FIG. 16 illustrates a flow diagram of a process 1040 of an exemplary embodiment.

The process can begin with step of selecting a multimedia file, such as a streaming audio/video file seen through a web browser (step 1000).

Then, the user starts the multimedia file (step 1002). In the next step (Step 1004), although the presentation was not initiated in the video yet, an initial slide presentation is automatically created, according to user preferences. The process of extracting and structuring information from the video to the slide presentation can be done on the fly for live events or, in case of previously recorded events, by processing the entire content beforehand.

In the next step (step 1006), the system processes the content, searching for regions in the video that there is an ongoing slide presentation.

After finding the region of interest, the system will extract and correlate elements from the current content (such as text, images, graphics, audio, etc.), aiming at creating the corresponding structured information (step 1008).

In the next step (step 1010), this invention also extracts relevant related content. Presenters' speeches are extracted and registered as slide notes. Moreover, relevant and related content detected in these speeches and in the slide elements may be used to retrieve further information by using a search engine.

In the same step (step 1010), commonly, content that conveys presentations do not display the slide that is being addressed. However, even in this case, the system is able to create an appropriate slide by extracting current semantics (understanding the presentation subject, the current specific topics, etc.) applying techniques such as NLP, machine learning, text-to-speech, concept extraction, etc.

In the next step (1012), during the presentation, the system may extract questions from participants' speeches and correspondent answer from the presenter. Also, the system may enrich answers by retrieving extra information using a search engine.

As the system further processes the content, new slides are created by applying the same approach (step 1014).

In the final step (1016) user curation is performed. For each extracted information, the user is able to give his feedback about it, correcting information that he deems necessary. The cognitive system will learn from this interaction, improving its mechanisms for detecting and extracting information.

Figure 17:
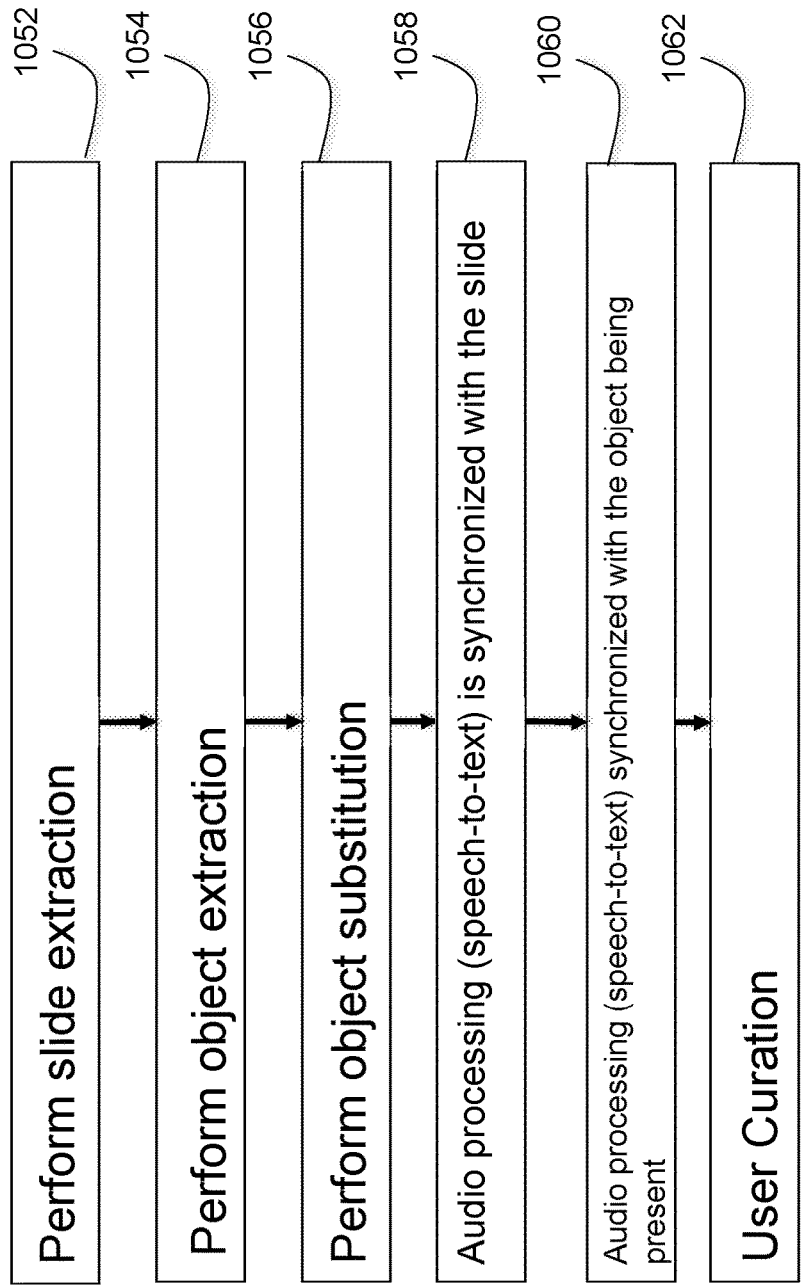
FIG. 17 illustrates a flow diagram of another exemplary embodiment.

FIG. 17 illustrates a flow diagram of a process 1050 of an exemplary embodiment. For example, slide extraction can be from multimodal content. As seen in step 1052, each slide extraction is made by processing the content (e.g.: in case of a video frame: detection, rotation, distortion, etc.) and created on the rich slide presentation. Monitors and cognitive computing (e.g. reasoning, inference) are used to automatically define slide transitions.

Then, as seen in step 1054, object extraction (image, text, video, etc.) is made from each slide. Monitors and cognitive computing (e.g. reasoning, inference) are used to automatically define object animations. Search engine, cognitive computing and knowledge base are used to improve accuracy of extracted object and slide.

In step 1056, object substitution is allowed through semantics and concepts (e.g. user can command the cognitive computing system to replace all image objects with different images according to a given specific licensing, such as Creative Commons).

Then in step 1058, audio processing (speech-to-text and natural language understanding) is synchronized with the slide being presented, enriched with cognitive computing, search engine, and knowledge base, to make rich annotations. Then in step 1060, audio processing (speech-to-text and natural language understanding) synchronized with the object being presented to enhance semantics and understanding.

Then in step 1062, user curation is made for each step (slide, object, animation, etc.) so the system can learn how to create better presentations with human-machine interaction.

Parts of one or more embodiments may be a device, a system, a method and/or a computer program product to control any aspects of the above mentioned techniques mentioned above. The computer program product in accordance with one or more embodiments includes a computer readable storage medium (or media) having program instructions thereon for causing a processor to carry out aspects of one or more embodiments.

Figure 18:
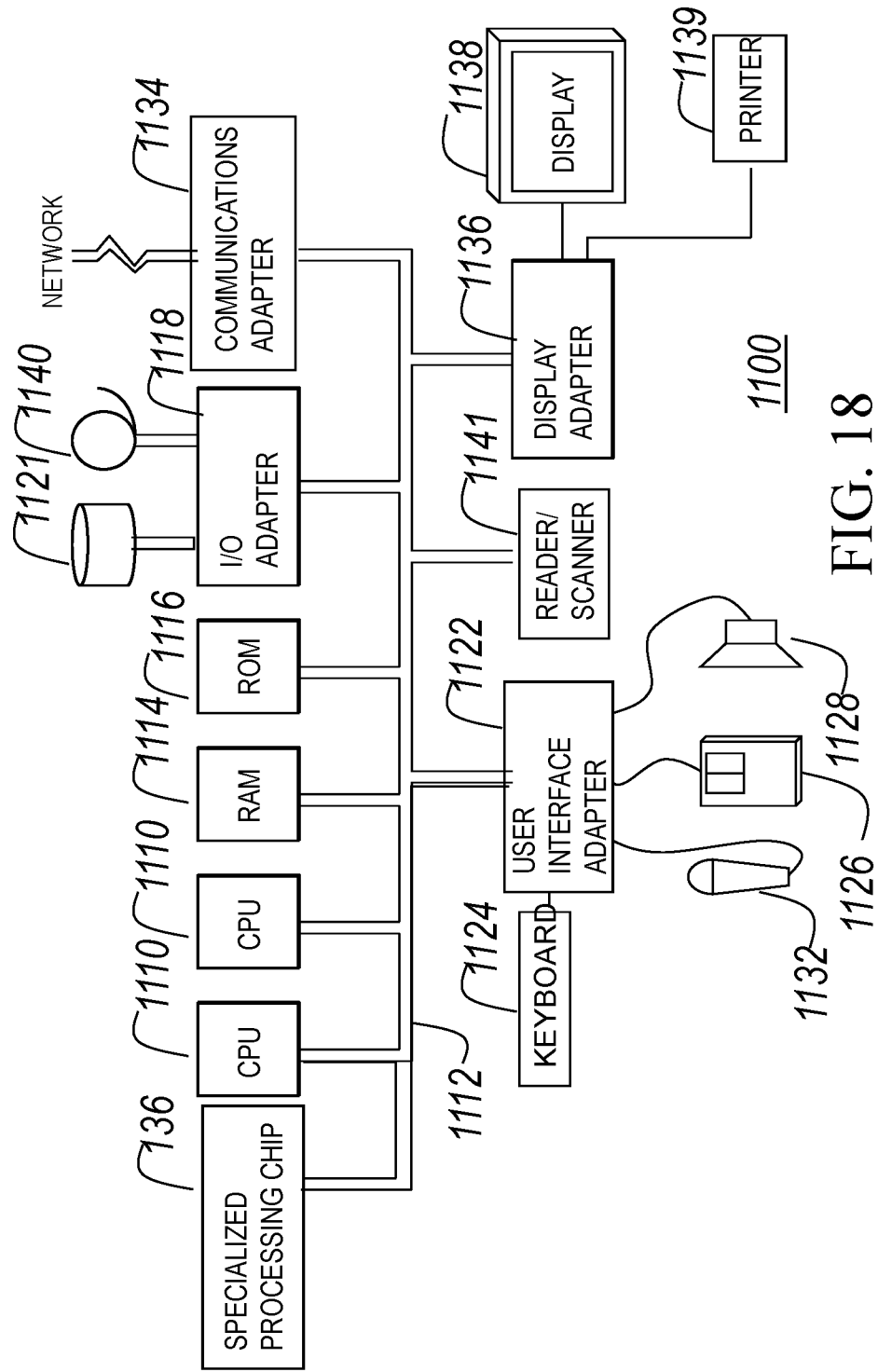
FIG. 18 illustrates an exemplary hardware/information handling system for incorporating the exemplary embodiment of the invention therein.

FIG. 18 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 and a specialized processing chip 136 (e.g., specific processing chip that is specialized for extraction and enriching slide presentations from multimodal content through cognitive computing) are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110, hardware description that configures the behavior of the specialized processing chip 136, and hardware above, to perform the method of the invention.

This signal-bearing storage media may include, for example, a RAM 1114 contained within the CPU 1110, as represented by the fast-access storage for example.

Figure 19:
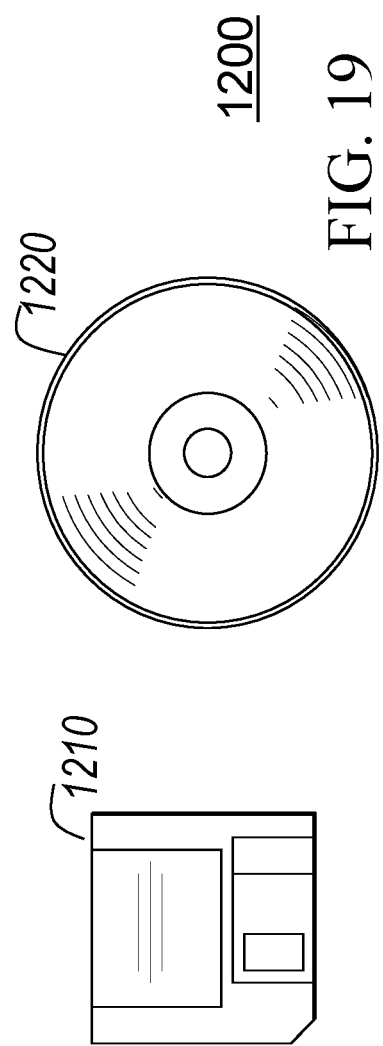
FIG. 19 illustrates a signal-bearing storage medium for storing machine-readable instructions of a program that implements the method according to the exemplary embodiment of the invention.

Alternatively, the instructions and hardware descriptions may be contained in another signal-bearing storage media 1200 (FIG. 19), such as a magnetic data storage diskette 1210 (FIG. 19) or optical storage diskette 1220 (FIG. 19), directly or indirectly accessible by the CPU 1110.

Whether contained in the diskette 1210, the optical disk 1220, the computer/CPU 1110, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device and hardware descriptions. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions and hardware descriptions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), or other specialized circuits may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 20:
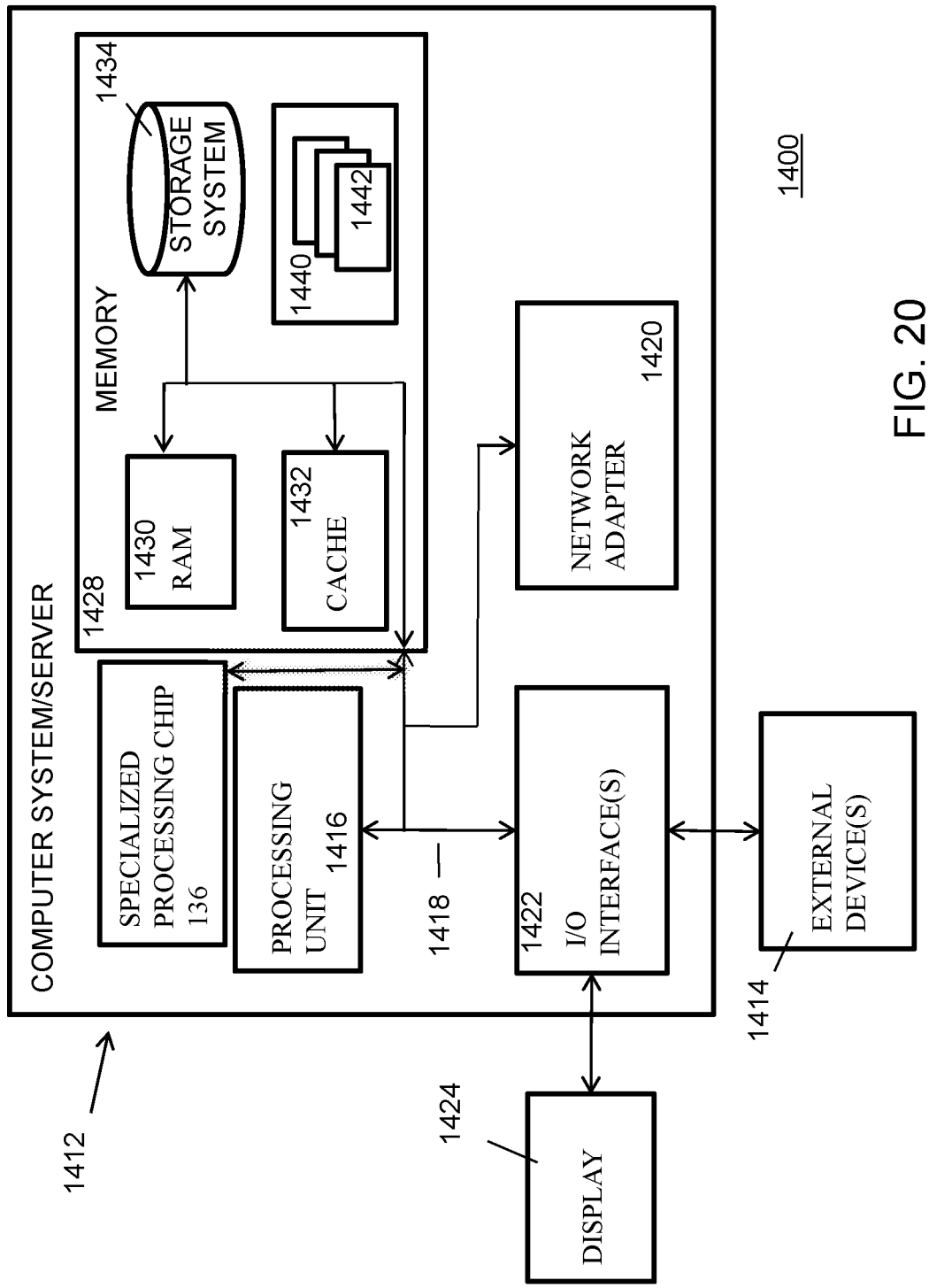
FIG. 20 depicts a cloud-computing node according to an embodiment of the present invention.

Referring now to FIG. 20, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 20, computer system/server 1412 in cloud computing node 1400 is shown in the form of a general-purpose computing device. The components of computer system/server 1412 may include, but are not limited to, one or more processors or processing units 1416, a specialized processing chip 136, a system memory 1428, and a bus 1418 that couples various system components including system memory 1428 to processor 1416. The input signals can be processed by the specialized processing chip 136 instead of the processing units 1416 processing the input signals.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 21:
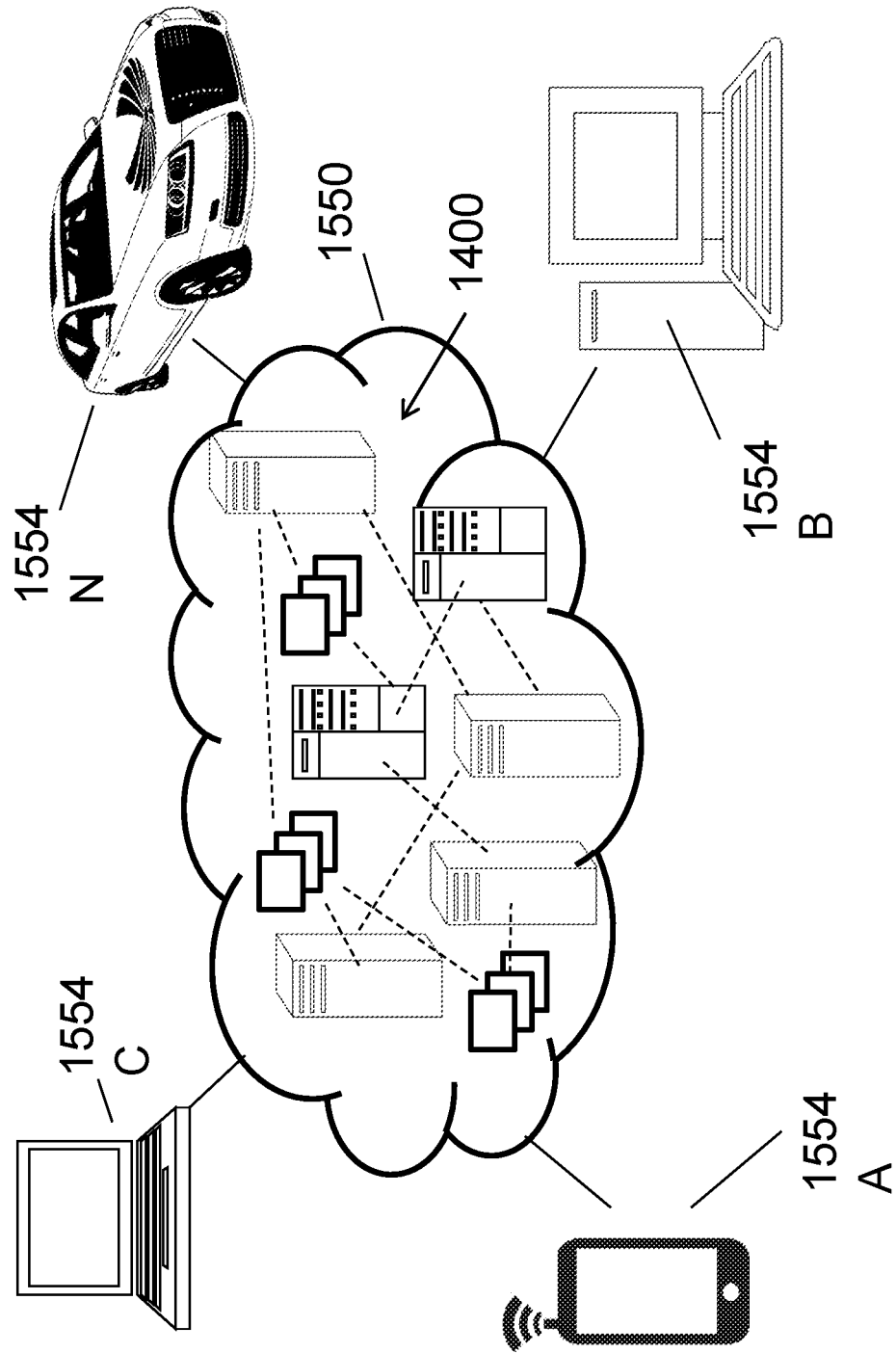
FIG. 21 depicts a cloud computing environment according to an embodiment of the present invention.

Referring now to FIG. 21, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 21 are intended to be illustrative only and that computing nodes 1400 and cloud computing environment 1550 can communicate with any type of computerized device over any type of network and/or network addressable connection (e.g., using a web browser).

Referring now to FIG. 22, a set of functional abstraction layers provided by cloud computing environment 1550 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud-computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

Therefore, in summary, current solutions are bounded to audiovisual content summarization, they try to identify relevant moments in audio or video, detecting for example slide transitions and animations. They segment the content and summarize it in a digest. The present invention's proposal is to extract and correlate content from multiple modalities to create a distinct slide document. The present invention proposes applying cognitive computing techniques to detect object and concepts in content. Besides extracting original content, the present invention enriches slide presentations with additional information retrieved through a search engine. Traditional solutions are agnostic to content semantics. Instead, the present invention focuses on content understanding, extracting and representing related knowledge in a Knowledge Base. Also, the present invention promotes user curation by learning from user feedback.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A method to extract and enrich slide presentations from multimodal content through cognitive computing, the method comprising:
    automatically performing extraction of slides from multimodal content including audio-visual content in real-time;
    automatically performing object extraction from each of the slides that are extracted;
    performing object substitution through semantics and concepts of the objects extracted;
    processing audio synchronized with the slides that are extracted and enriched with cognitive computing, search engine, and knowledge base in a live stream, to provide annotations of the slides;
    processing the audio synchronized with the object being presented in each slide according to the semantics;
    curating for each step with human-machine interaction to provide a learning process by the system; and
    processing, by a content processor, each content modality from the multimodal content and communicating with a cognitive computing system by using the knowledge base,
    wherein each slide extraction is performed by processing the content and using interactive input and cognitive computing to automatically define slide transitions.

2. The method according to claim 1,
    wherein the automatically performing extraction of slides in the live-stream in real-time includes finding and extracting slides based on the audio-visual content according to content semantics,
    wherein processing audio synchronized with the slides being enriched further includes enriching from multimodal content through cognitive computing including slide extraction, slide transition extraction, object extraction, object animation extraction, and allowing object substitution,
    wherein each slide extraction is performed by processing the content of video frames by detection, rotation, distortion and using monitors and cognitive computing to automatically define slide transitions, and
    wherein the processing of the audio synchronized with the object being presented in each slide is to enhance semantics and understanding,
    further comprising processing video of the audio-visual content by searching for regions that there is an ongoing slide presentation to detect objects, presenters and presentation content in real-time along with the processing of the audio.

3. The method according to claim 1, wherein each slide extraction is performed by processing the content of video frames by detection, rotation, distortion and using monitors and cognitive computing to automatically define slide transitions, and
wherein the processing of the audio synchronized with the object being presented in each slide is to enhance semantics and understanding,
further comprising processing video of the audio-visual content by searching for regions that there is an ongoing slide presentation to detect objects, presenters and presentation content in real-time along with the processing of the audio.

4. The method according to claim 1, wherein in the object extraction from each slide includes using monitors and cognitive computing to automatically define object animations, using a search engine, cognitive computing and knowledge base to increase accuracy of extracted object and slides,
wherein the audio-visual content is processed to detect video content through regions of streamed images, and
wherein processing the audio is performed by a processor, while processing the content modality is by the content processor separate from the processor.

5. The method according to claim 1, wherein the allowing of object substitution through semantics and concepts includes commanding a cognitive computing system to replace all image objects with related images according to a given specific licensing, such as Creative Commons.

6. The method according to claim 1, wherein the audio processing includes speech-to-text and natural language understanding synchronized with the slides.

7. The method according to claim 1, wherein the learning process includes registering information in a database according to received feedback information.

8. A computer program product comprising a computer readable storage medium having program instructions embodied therewith, the program instructions and hardware descriptions readable and executable by a computer to cause the computer to:
automatically performing extraction of slides from multimodal content including audio-visual content;
automatically performing object extraction from each of the slides;
executing object substitution through semantics and concepts of the objects extracted;
processing audio synchronized with the slides enriched with cognitive computing, search engine, and knowledge base in real-time, to provide annotations of the slides; and
processing the audio synchronized with the object being presented in each slide according to semantics in real-time.

9. The computer program product according to claim 8, further comprising curating for each step with human-machine interaction to provide a learning process by the system,
wherein each slide extraction is performed by processing the content and using interactive input and cognitive computing to automatically define slide transitions,
further comprising processing the audio-visual content to detect specific objects from video content through regions of streamed images.

10. The computer program product according to claim 8, wherein each slide extraction is performed by processing the content of video frames by detection, rotation, and distortion and using monitors and cognitive computing to automatically define slide transitions, and
wherein the processing of the audio synchronized with the object being presented in each slide is to enhance content semantics and understanding.

11. The computer program product according to claim 8, wherein in the object extraction from each slide includes using monitors and cognitive computing to automatically define object animations, and using a search engine, cognitive computing and knowledge base to increase accuracy of extracted object and slides.

12. The computer program product according to claim 8, wherein the allowing of object substitution through content semantics and concepts includes commanding a cognitive computing system to replace all image objects with images according to a given specific licensing, such as Creative Commons.

13. The computer program product according to claim 8, wherein the audio processing includes speech-to-text and natural language understanding synchronized with the slides.

14. The computer program product according to claim 8, wherein the learning process includes registering information in a database according to received feedback information.

15. A system, comprises:
a network;
a virtual computer connected to the network, comprising:
a virtual memory storing computer instructions;
a virtual processor executing the computer instructions and configured to:
automatically perform extraction of slides from multimodal content including audio-visual content;
automatically perform object extraction from each of the slides;
allow object substitution through semantics and concepts of the objects extracted;
process audio synchronized with the slides enriched with cognitive computing, search engine, and knowledge base, to provide annotations of the slides; and
process the audio synchronized with the object being presented in each slide according to semantics.

16. The system according to claim 15, further comprising curate for each step with human-machine interaction to provide a learning process by the system,
wherein each slide extraction is automatically performed by processing the content and using interactive input and cognitive computing to automatically define slide transitions,
wherein each slide extraction is automatically performed by processing the content of video frames by detection, rotation, and distortion an using monitors and cognitive computing to automatically define slide transitions, and
wherein the processing of the audio synchronized with the object being presented in each slide is to enhance content semantics and understanding.

17. The system according to claim 15, wherein each slide extraction is automatically performed by processing the content of video frames by detection, rotation, and distortion and using monitors and cognitive computing to automatically define slide transitions, and wherein the processing of the audio synchronized with the object being presented in each slide is to enhance content semantics and understanding.

18. The system according to claim 15, wherein in the object extraction from each slide includes using monitors and cognitive computing to automatically define object animations, and using a search engine, cognitive computing and knowledge base to increase accuracy of extracted object and slides.

19. The system according to claim 15, wherein the allowing of object substitution through content semantics and concepts includes commanding a cognitive computing system to replace all image objects with images according to a given specific licensing, such as Creative Commons.

20. The system according to claim 15, wherein the audio processing includes speech-to-text and natural language understanding synchronized with the slides, and
wherein the learning process includes registering information in a database according to received feedback information.

\* \* \* \* \*